UNITED STATES PATENT OFFICE.

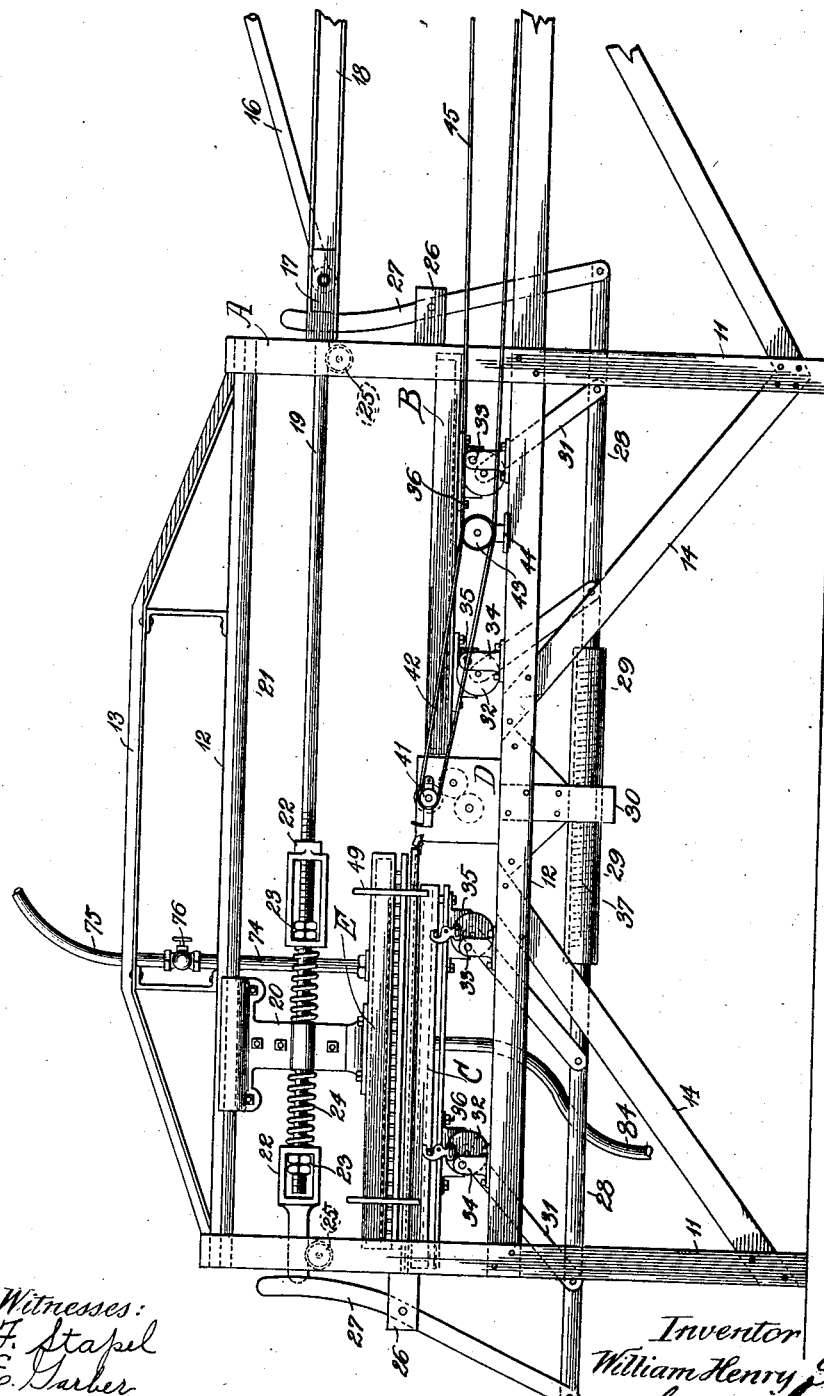

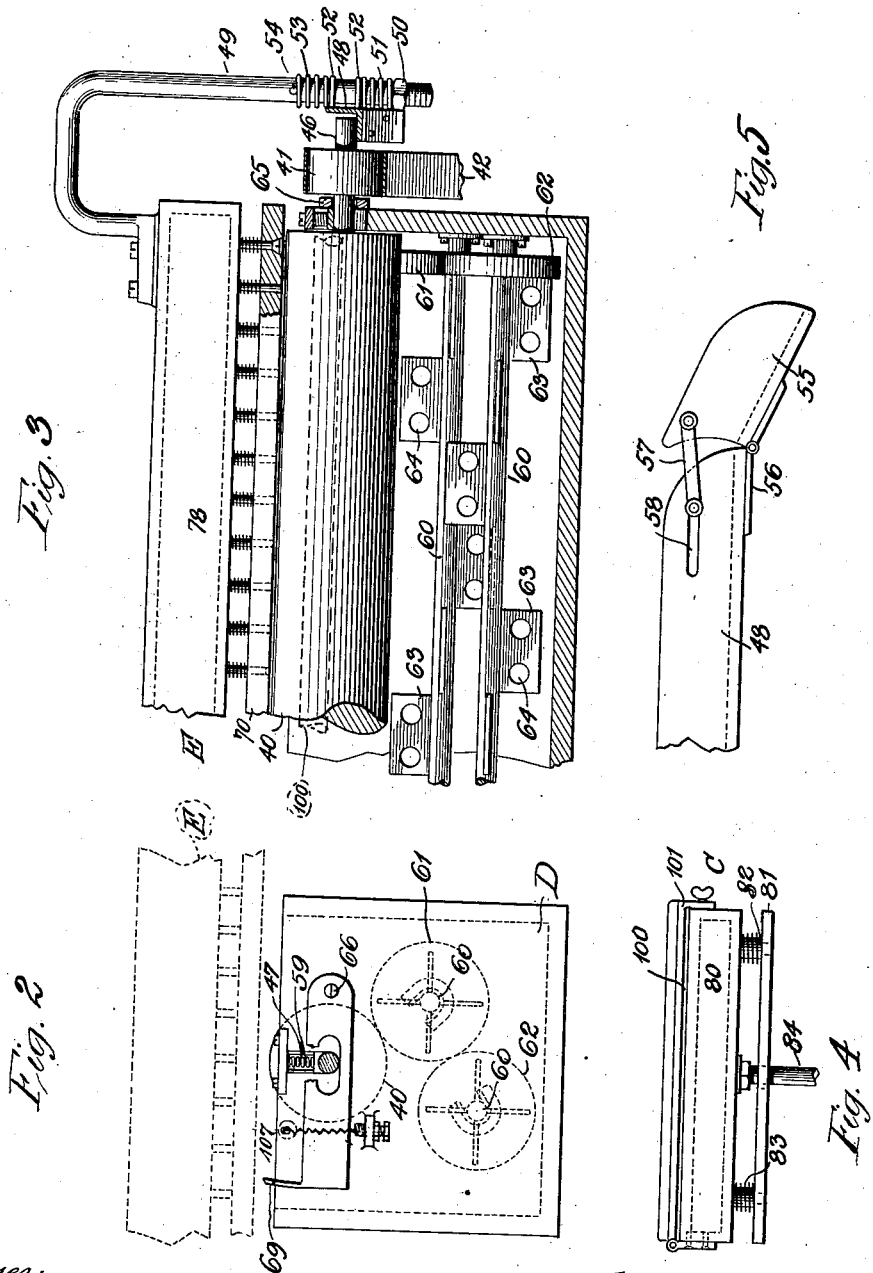

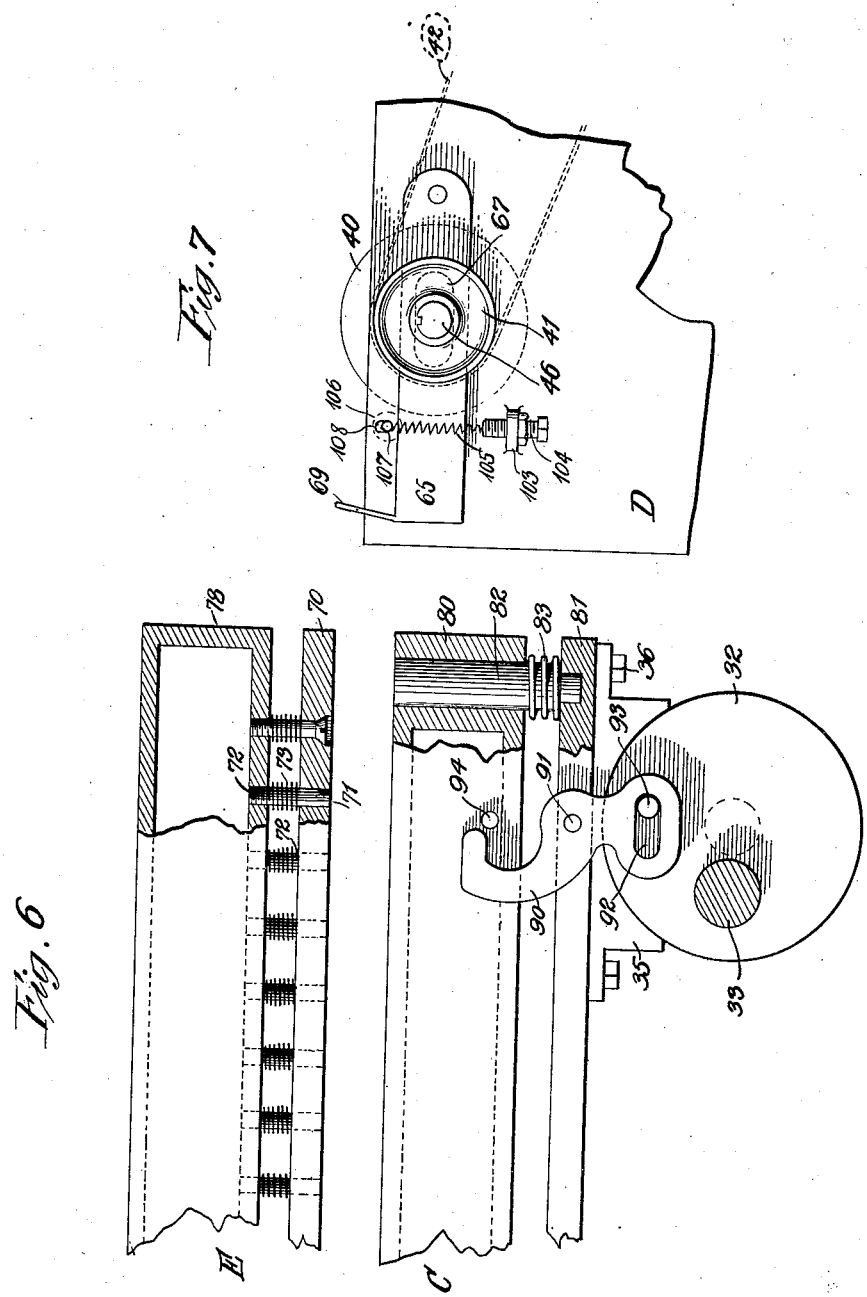

WILLIAM HENRY SILLS, OF CHICAGO, ILLINOIS.

MACHINE FOR MAKING MICA-BOARD OR THE LIKE.

1,024,529.  Specification of Letters Patent.  Patented Apr. 30, 1912.

Application filed April 19, 1911. Serial No. 622,112.

*To all whom it may concern:*

Be it known that I, WILLIAM HENRY SILLS, a citizen of the United States, residing at Chicago, in the county of Cook and State of Illinois, have invented a new and useful Machine for Making Mica-Board or the Like, of which the following is a specification.

This invention relates to machines for making mica board or other kinds of board composed of a large number of films, scales, splittings or waste pieces of irregular or uniform shape.

In known machines of this kind the film material usually was applied to a moving drum or conveyer by feeding the material thereto from a hopper, coating the material with an adhesive and pressing it into layers on the conveyer itself or on a second conveyer.

An object of this invention is to provide a machine in which a contiguous layer of films or similar material is removed in one operation from a receptacle containing the films and is transferred to a support for the mica board to be built. By repeating this operation the films primarily located within the receptacle will finally be disposed on the support in layers of predetermined size.

Another object of the invention is to provide a machine, in which a reciprocating carrier serving for transferring the films from the receptacle to the support is alternatingly brought into engagement with said receptacle and support respectively by means actuated by the carrier itself, when the same is in suitable position.

Another object of the invention is to provide a machine, in which an adhesive is applied to the entire face of the carrier by means actuated by the carrier itself during the movement of the carrier toward the receptacle of films.

Another object of the invention is to provide means for facilitating the removal of the layer of films from the carrier and for depositing said layer on a support, said means comprising a plurality of elements projecting toward the layer of films, when the support for the board is at a suitable distance therefrom.

Another object of the invention is to provide resilient supporting means for the film carrying device and the table on which the layers are deposited for the purpose of facilitating the removal of films and the application of the adhesive.

Another object of the invention is to provide scraping means for the film carrier to clean the same from scales and such like before a coat of adhesive is applied.

Other objects and features of the invention will be more fully described in connection with the accompanying drawings, which form a part of the specification, and will be more particularly pointed out and ascertained in and by the following claims.

In the drawings which illustrate by way of example one embodiment of the invention: Figure 1 is a side elevation of a machine for making mica board or the like. Fig. 2 is a side elevation, partly in section, of the container for the adhesive and of the means for applying the same. Fig. 3 is a sectional view, partly in elevation, showing the carrier and the means for coating the same in operative position, and also showing means within the container for maintaining the adhesive in agitation. Fig. 4 is a front elevation of the support for the mica board to be made. Fig. 5 shows in side elevation a portion of the means for bringing the coating member into engagement with the carrier. Fig. 6 shows on a larger scale in side elevation and partly in section, the carrier and the support for the board in superposition and Fig. 7 shows in side elevation the scraping means for the carrier.

The frame A of the machine comprises a plurality of uprights 11, interconnected by horizontal beams 12 and top braces 13. The lower beams 12 are connected with the uprights by braces 14 so as to impart a sufficient rigidity to the structure.

Movably mounted near one end of the frame is the receptacle B for the material of which the board is to be made, and near the other end of the machine the support C for the finished product is disposed. The container D for the adhesive is located between said receptacle and support, resting on the beam 12.

The carrier E is reciprocatably mounted within the frame. The carrier is reciprocated by means of a crank rod 16 which is connected in a well known way to a revolving crank or such like, not shown; a crosshead 17 or some other suitable device, sliding in guides 18 serves for converting the oscillatory movement of the rod 16 to a reciprocating movement on the carrier E. These parts and their function are well known in the art and it will not be necessary to describe them in detail.

A rod 19 connects the crosshead 17 with a hanger 20 which serves as a means for supporting the carrier E. The hanger 20 is slidably mounted on the rod 21, secured in the frame A of the machine, and it is fastened to the carrier in some suitable way. It is obvious that two or more connecting rods 19 may extend from the crosshead 17, each of them carrying a hanger 20 so as to suspend the carrier E on a plurality of points and prevent transverse vibrations.

The rod 19 is provided with threaded portions near the carrier, and buckles 22 are adjustably secured thereon by means of nuts 23. Springs 24 are interposed between the hanger and the buckles to press the same into resilient engagement with the nuts. For the purpose of providing additional guiding means for the connecting rod 19 rollers 25 are mounted in the end portions of the frame.

In supports 26 projecting at both ends of the machine from the uprights 11 levers 27 are pivotally secured, extending upwardly from their fulcrums, so as to be engaged by the buckles 22, when the carrier reaches the end of its stroke. Springs 24 on rod 19 will serve to lessen the shock of the impact on the hanger 20 and carrier E.

The lower ends of levers 27 are pivotally connected to one end of a rod 28, the other end of which rests within a tubing 29 secured to the frame A by means of the hanger 30. Links 31, preferably in parallel arrangement, extend upwardly from rod 28 and lead to the means for bringing the receptacle B and the support C into engagement with the carrier E at the end of its stroke. These means comprise in combination with levers 27 and links 28 rollers 32 mounted by means of pins 33 eccentrically in bearings 34 which are fastened to beams 12. Journal parts 35 resting on the rollers 32 are by means of screws 36 or in some other way detachably connected to support C and receptacle B respectively, so that these last named elements may be readily removed and be replaced by other elements whenever desired.

It will be obvious that by the engagement of buckles 22 with levers 27 the receptacle B and support C will be displaced and will be maintained in a position in which they, or the films disposed thereon will be in engagement with the carrier. When the carrier starts on the return stroke the support C and receptacle B will return to their normal position, partly on account of their own weight and partly by means of springs 37 located in tubing 29 which are compressed when the lever 27 and rod 28 are actuated. Upon release of the lever 27 from engagement with the carrier-buckles 22 the springs 29 will have the tendency to return the rod 28 and therefore also links 31 and the parts connected therewith to normal position.

The container D interposed between the receptacle B and support C on the frame is preferably filled with varnish or some other suitable adhesive. It may be provided with a jacket (not shown) for the purpose of conducting a fluid therethrough to keep the adhesive at a certain temperature. A member 40 is rotatably mounted in the upper part of the container and serves as means for applying adhesive to the entire face of the carrier. The member 40 in form of a roller is provided with a pulley 41 driven by a belt 42, laid about a pulley 43 which is supported in bearing 44 on the frame A, and which last named pulley is driven by a belt 45, connecting the pulley 43 with the crank shaft (not shown) or with some other rotary member. Shaft 46 of the roller 40 rests in slots 47 in the wall of the container, so that the roller may be raised to come into engagement with the face of the carrier and to transfer by contact therewith adhesive to the carrier. The means for raising the roller 40 are secured to the carrier itself and comprise a track 48 disposed on both sides thereof and having preferably the shape of an angle iron. The angle iron is fastened to hangers 49 mounted on the carrier and is adjustably held thereon by means of nuts 50 engaging a spring 51 interposed between the nuts and a fastening lug 52 of the track. A similar spring 53 is disposed on the hanger 49 above the track resting against a pin 54 projecting from the hanger, so that the track is adjustably and resiliently mounted with respect to the carrier. The forward end of the track is provided with a finger 55 pivotally connected therewith by means of a hinge 56 and held normally in a slanting position. The rear end of the finger 55 carries a link 57 which may be guided in a slot 58 provided in the adjacent end of the track, so that an oscillatory movement of the finger is rendered possible.

It will be understood from the drawing that in the movement of the carrier finger 55 enters below the projecting end of the shaft 46 of the rotating member 40 and gradually brings this member into contact with the face of the carrier C. It is maintained in this contact position in which it may be rotated by the frictional engagement with the carrier or by belt 42, as long as the track 48 is in engagement with the shaft 46. By this means it is possible to apply a coat of adhesive to the entire surface or to a part of the surface of the carrier. After the disengagement of track 48 from shaft 46 the roller 40 will be returned to normal position by its weight and by means of springs 59 disposed in slot 47 and pressing against the shaft of the roller.

For the purpose of agitating the adhesive to maintain the same in the proper liquid condition a plurality of means are provided, which are preferably actuated by the rotating member 40. The agitating means comprise shafts 60, rotatably mounted within the container and provided with friction rollers 61 and 62 respectively, the roller 61 being in frictional engagement with rotating member 40, as long as the same is in inoperative position, and roller 62 contacting with roller 61. The shafts 60 are provided with a plurality of wings 63 having apertures 64 to decrease the resistance of the adhesive against the movement of the wings. As will be seen from the drawing, Fig. 3 the wings on each shaft project from the shaft in right angles with respect to each other, and the wings on one shaft project in a plane angularly disposed to the plane of the wings on the other shaft which have the same respective distance from the side wall of the container, so that the wings of the two shafts are staggered with respect to each other.

Coacting with the rotating member 40 and actuated thereby a scraping means is provided, adapted to be raised and lowered simultaneously with the rotating member, but being disposed so that it engages the carrier before the coating member 40 enters into contact with the carrier.

As may be seen from the drawing the scraping means comprises a bar 69 extending transversely above the container D and having lateral arms 65 pivotally secured by means of screw 66 to the side wall of the container. The lateral arms are provided with slots 67 through which the shaft 46 of the rotating member projects, so that by vertical displacement of the rotating member the bar 69 will be displaced in the same direction. The bar is adapted to contact with the face of the carrier E when it is raised and to scrape said face to remove scales, films or adhesive which has not been deposited on the support C.

It is obvious that the displacement of the rotating member 40 and the bar 69 occurs only during the forward stroke of the carrier, after the finger 55 has lifted the shaft 46. In the return stroke of the carrier a displacement of the rotating member and of the bar will not take place.

The carrier comprises a film receiving plate 70 and a supporting member 78 therefor, the plate being movably disposed with respect to the member and being resiliently connected therewith. The plate is provided with a large number of perforations 71 into which pins 72 secured to the supporting member project. The pins are surrounded by springs 73 which serve to press the plate downwardly, so as to bring the same into resilient engagement with the coating member 40, and with the films disposed in the receptacle B. The supporting member in the embodiment shown comprises a box from which a pipe 74 extends which is in communication with a flexible tubing 75 so that a fluid of high temperature may be introduced to the interior of the box whenever the nature of the adhesive should require this arrangement. As may be seen from Fig. 1, a valve 76 is interposed between the pipe 74 and the flexible tubing 75.

The support C on which the layers of films, splittings, scales or such like are to be stacked comprises, in the embodiment shown, a mica receiving table 80 and a plate 81 provided with means for supporting the table resiliently. For this purpose pins 82 are securely fastened to the plate and springs 83 are interposed between the table and the plate surrounding the pins 82. The mica receiving table is preferably a box shaped element into the interior of which a cooling means may be introduced through the pipe 84.

It is desirable that the film receiving plate 70 should be pressed upwardly when the support C enters into engagement with the carrier E so that the layer of films adhering to the carrier may be removed therefrom by means of the large number of projecting pins and may come in contact with the support or with the layer of films deposited on said support previously. By reference to Fig. 6 it will be understood that the support C coming into contact with the film receiving plate 70 will press the same toward the box shaped structure 78. When the pressure of the support is maintained the plate 81 will be pressed upwardly against the box structure 80 so that pins 82 projecting from the plate 81 of the support will engage the film receiving table 70 and will press the same upwardly. By this means the pins 72 of the carrier will project beyond the face of the film receiving plate, so that the layer of films with which said face is covered will be engaged on a plurality of points and will be deposited on the upper face of the box 80.

Means are provided for effecting the return movement of this box or mica receiving table 80 together with the movement of the plate 81. For this purpose a catch 90 is pivotally secured to the plate 81 by means of pin 91, the lower part of the catch being provided with a slot 92 through which a pin 93 disposed on the roller 32 projects. In the lifting movement of the roller the same is partly rotated swinging thereby the catch 90 so that the upper end thereof projects toward a pin 94 mounted on the box shaped structure 80, and it connects thereby the table 81 securely with this structure. In the return movement of the roller the catch 90 will be released by the engagement of the end walls of slot 92 with the pin 93 so that the catch is released from the pin 94. As has been stated previously the support C will be returned to normal position partly by its own weight and partly by springs 37, located within the tubing 29, as soon as the buckle 22 is out of engagement with the free end of the lever 27.

As may be seen from Figs. 2 and 7, a roller 106 provided with the journal 107 is rotatably mounted in a slot 108 in the container D. When the roller 40 is raised into position in which it engages the carrier, the surface of said roller will contact with the roller 106 so that an over large amount of adhesive, which might be on the surface of the roller 40, is removed therefrom. The roller 106 is returned to a position in which it is out of engagement with the roller 40 by means of a spring 105 hooked around the journal 107 of the roller and fastened at its other end to a screw 104 which extends adjustably through a lug 103 on the wall of the container. By means of this device the adhesive on the roller will be evenly spread out thereon and an excessive amount of adhesive taken along by the roller will be conveyed back to the interior of the container D.

The operation of the machine is as follows: The receptacle B is filled with a certain amount of scales or films of mica or other material. If it is desired to manufacture a plate which should contain a certain weight of this material the receptacle B is filled with material, having the desired weight and the operation of the machine is continued until the entire contents of the receptacle is deposited on the support C. The carrier E is reciprocated in the manner described or in some other suitable way. Starting from the left hand position as shown in Fig. 1, the finger 55 secured to the track will in the movement of the carrier E raise the shaft 46 of the roller 40 so that the same enters into contact with the face of the film receiving plate 70 and applies an adhesive to said face, the application being continued as long as a portion of the track 48 underlies the shaft 46 of the roller 40. Simultaneously with the roller the scraper 69 is raised to engage the face of the film receiving plate and to remove adhesive and other materials still sticking to the face. The scraper is disposed in advance of the roller, so that, although actuated simultaneously with the roller it engages the plate 70 prior to said roller. When the carrier at the right hand end of its stroke engages by means of buckle 22 the lever 27 the receptacle B is raised so that the upper films or scales in said receptacle are pressed against the film receiving plate 70 which is resiliently suspended. These upper films will stick to the face of the plate 70 and will be transferred to the support C in the return movement of the carrier. It will be seen that in the return movement the track will not engage the shaft of the rotating member 40 so that in the return movement no coating is applied to the films or to the carrier.

It is desirable to dispose a plate 100 on the upper face of the support C on which the layers of films are to be deposited from the carrier. As will be seen from Fig. 4 this base plate 100 is held on the support by means of a clamp 101 pivotally connected to the box shaped structure 80. By opening the clamp the plate 100 forming the base of the board may readily be removed and another plate may be inserted under the clamp. When the carrier reaches the end of its return stroke the buckle 22 will cause the elevation of the support C by means of lever 27 links 31 and eccentrics 32. The box shaped structure 80 will engage the layer of films on the face plate 70 and in the continuation of this elevating movement the film receiving plate 70 will recede beyond the projecting ends of the pins 72. By this means the layer of films will now be engaged by a plurality of depressing means and will be deposited either on the base plate 100 which is coated with some adhesive or on the layers of films previously deposited on the support and resting now on support C so that their faces still provided with the coating of adhesive transferred from the film receiving plate are directed upwardly. The operation is continued until the receptacle B is partly or completely emptied. This receptacle may then be detached from the lifting means and another receptacle containing the necessary weight of raw material may be inserted into the machine. The base plate 100 may be removed from support C and the machine is ready for making another board.

I claim:

1. A machine for making mica board or the like, comprising in combination, a receptacle for mica films, a support for the mica board, a movable carrier for transferring a layer of films from the receptacle to the support, and means actuated by the carrier for bringing the carrier into engagement with the films and the support.

2. A machine for making mica boards or the like, comprising in combination, a receptacle for mica films, a support for the mica board, a reciprocating carrier for transferring a layer of films from the receptacle to the support, and means actuated by the carrier at the ends of the stroke for bringing the carrier into engagement with the films and the support respectively and for maintaining said engagement, as long as the carrier remains in the end position.

3. A machine for making mica boards or the like, comprising in combination, a receptacle for films, a support for the mica board, a movable carrier for transferring a layer of films from the receptacle to the support, and means for displacing the films and support respectively to come into engagement with the carrier.

4. A machine for making mica boards or the like, comprising in combination, a receptacle for films, a support for the mica board, a movable carrier for transferring a layer of films from the receptacle to the support, means for displacing the receptacle and support respectively with respect to the carrier and for returning the same to normal position.

5. A machine for making mica board or the like, comprising in combination, a receptacle for films, a support for the mica board, a movable carrier, means for applying an adhesive to the face of the carrier and means for bringing the carrier successively to the application of the adhesive into engagement with the films and the support.

6. A machine for making mica board or the like, comprising in combination, a receptacle for films, a support for the mica board, a reciprocating carrier, means for applying an adhesive to the carrier during the movement thereof in one direction, and means for bringing the carrier successively to the application of the adhesive into engagement with the films and the support.

7. A machine for making mica board or the like, comprising in combination, a receptacle for films, a support for the mica board, a reciprocating carrier, a container for an adhesive, means for transferring adhesive from the container to the carrier, during the movement of the carrier in one direction and while the carrier is above said container, and means for bringing said carrier successively into engagement with the films and the support.

8. A machine for making mica board and the like, comprising in combination, a receptacle for films, a support for the board, a reciprocating carrier, a container for an adhesive, a member for transferring adhesive from the container to the carrier, means for bringing said member into engagement with the carrier, and means for bringing the carrier into engagement with the films and the support.

9. A machine for making mica board and the like, comprising in combination, a receptacle for films, a support for the board, a reciprocating carrier, a container for an adhesive, means for bringing the carrier successively into engagement with the films and the support, a member for transferring adhesive from the container to the carrier, and means secured to the carrier for displacing said member to bring the same into engagement with said carrier prior to the engagement of the same with the films.

10. A machine for making mica board or the like, comprising in combination, a receptacle for films, a support for mica board, a carrier, means for bringing the carrier alternately into engagement with the films and the support, and means for coating the carrier with an adhesive in an interval between two engagements.

11. A machine for making mica board or the like, comprising in combination, a receptacle for films, a support for mica board, a reciprocating carrier, a container for an adhesive, a rotating member within the container, means secured to the carrier for bringing the rotating member into engagement with the carrier and for maintaining said member for a predetermined period in engaging position, and means for bringing the carrier alternately in engagement with the films and the support.

12. A machine for making mica board or the like, comprising in combination, a receptacle for films, a support for mica board, a reciprocating carrier, a member for applying adhesive to the carrier, means secured to the carrier for bringing the member to coaction with the carrier, means for returning the member to inoperative position, and means for bringing the carrier successively into engagement with the films and the support.

13. A machine of the character described, comprising a reciprocating carrier, means for coating the same with an adhesive, means for applying a layer of films to the coated carrier, a support, and means for depositing the layer of films from the carrier on the support.

14. In a machine of the character described, a reciprocating carrier, means for coating the carrier with an adhesive, means for applying a layer of films thereto, means for removing the layer of films therefrom, and means for scraping the carrier prior to the application of the adhesive.

15. In a machine of the character described, a reciprocating carrier, means for coating the carrier with an adhesive, means for scraping the carrier prior to the application of the adhesive said scraping means being operatively connected with said coating means, means for applying a layer of films thereto and means for removing the layer of films therefrom.

16. In a machine of the character described, the combination of a reciprocating carrier, a container for an adhesive, a rotating member for transferring adhesive by contact to the carrier, a plurality of agitating means within the container and driven by said member, each of said means having wings staggered with respect to the wings of the adjacent member.

17. In a machine of the class described, the combination of a reciprocating carrier, a track secured to the carrier, a member for coating the carrier with adhesive, means coacting with the track for bringing said member in position to be supported by the track and to be held in engagement with the carrier, and means for returning the member automatically to the position previously occupied.

18. In a machine of the class described, the combination of a reciprocating carrier, a track adjustably secured to the carrier, a member for coating the carrier with adhesive, means coacting with the track for bringing said member in position to be supported by the track and to be held in engagement with the carrier, and means for returning the member to the position previously occupied.

19. In a machine of the class described, the combination of a reciprocating carrier, a member for coating the carrier with an adhesive, means coacting with the carrier for pressing said member in resilient engagement with the carrier, and means for returning the member after a predetermined period to the position previously occupied.

20. In a machine of the class described, the combination of a reciprocating carrier, a container for an adhesive, a rotating member adapted to be displaced to engage the carrier, a scraper pivotally mounted on the container and projecting forwardly of the member, said scraper being adapted to be engaged by a portion of said member and to be moved simultaneously therewith.

21. In a machine of the class described, a carrier, comprising a movable supporting member, and a film receiving plate reciprocatably disposed with respect to the supporting member, substantially as described.

22. In a machine of the class described, a carrier, comprising a movable supporting member, and a flat film receiving plate resiliently connected with the supporting member movable with the same.

23. In a machine of the class described, a carrier, comprising a supporting member, a perforated film receiving plate, and elements projecting from said member through the perforations in said plate.

24. In a machine of the class described, a support for the mica board comprising a mica receiving table and a plate having means in engagement with a surface of said plate for supporting said table resiliently.

25. In a machine of the class described, the combination of a film receiving plate, a mica board support, said plate being provided with perforations, pins projecting through said perforations, means for pressing said support in direction toward the film receiving plate, and means in coaction with said support for displacing said plate with respect to said pins prior to the engagement of said support with said pins.

26. In a machine of the class described, a film receiving plate, and means in coaction with the plate for engaging a layer of films at a plurality of points, when said plate is removed from said layer.

27. In a machine of the class described, the combination of a mica board support, comprising a mica board receiving table and a plate resiliently connected therewith, means for pressing said plate and table upwardly and means for rigidly connecting said plate and table when in elevated position.

28. In a machine of the class described, the combination of a mica board receiving table, a plate resiliently connected therewith, lifting means engaging said table, a catch adapted to be actuated by said lifting means, a pin projecting from said table, adapted to engage said catch, when the lifting means are actuated and to be disengaged therefrom upon release of said lifting means.

Chicago, Ill., April 17, 1911.

WILLIAM HENRY SILLS.

Witnesses:
C. Heymann,
E. Garber.

Copies of this patent may be obtained for five cents each, by addressing the "Commissioner of Patents, Washington, D. C."